United States Patent
Prasad et al.

(10) Patent No.: US 10,657,218 B2
(45) Date of Patent: May 19, 2020

(54) WIRELENGTH DISTRIBUTION SCHEMES AND TECHNIQUES

(71) Applicant: Arm Limited, Cambridge (GB)

(72) Inventors: Divya Madapusi Srinivas Prasad, Austin, TX (US); Saurabh Pijuskumar Sinha, San Antonio, TX (US); Brian Tracy Cline, Austin, TX (US); Stephen Lewis Moore, Austin, TX (US)

(73) Assignee: Arm Limited, Cambridge (GB)

( * ) Notice: Subject to any disclaimer, the term of this patent is extended or adjusted under 35 U.S.C. 154(b) by 218 days.

(21) Appl. No.: 15/826,649

(22) Filed: Nov. 29, 2017

(65) Prior Publication Data
US 2019/0163860 A1   May 30, 2019

(51) Int. Cl.
*G06F 17/50* (2006.01)

(52) U.S. Cl.
CPC ...... *G06F 17/5077* (2013.01); *G06F 17/5072* (2013.01); *G06F 2217/02* (2013.01); *G06F 2217/06* (2013.01); *G06F 2217/12* (2013.01)

(58) Field of Classification Search
CPC ............. G06F 17/5072; G06F 17/5077; G06F 17/5081; G06F 2217/12
USPC .......................................... 716/113, 119, 126
See application file for complete search history.

(56) References Cited

U.S. PATENT DOCUMENTS

| | | | | |
|---|---|---|---|---|
| 2008/0120582 A1* | 5/2008 | Wang | .................. | G06F 17/5072 716/113 |
| 2018/0157782 A1* | 6/2018 | Rossi | .................. | G06F 17/5077 |
| 2019/0065655 A1* | 2/2019 | Chung | ................ | G06F 17/5081 |

OTHER PUBLICATIONS

Song, et al.; "Unified Technology Optimization Platform using Integrated Analysis (UTOPIA) for holistic technology, design and system co-optimization at <= 7nm nodes"; 2016 Symposium on VLSI Circuits Digest of Technical Papers; IEEE; 2016.
Bardon, et al,; "Extreme Scaling enabled by 5 Tracks Cells: Holistic design-device co-optimization for FinFETs and Lateral Nanowires"; IEEE; 2016.
Chang, et al.; "IEDM 2012 Short Course"; 2012.
Joyner, James W.; "Opportunities and Limitations of Three-dimensional Integration for Interconnect Design"; Thesis, Georgia Institute of Technology; Jul. 2003.
(Continued)

*Primary Examiner* — Paul Dinh
(74) *Attorney, Agent, or Firm* — Pramudji Law Group PLLC; Ari Pramudji (57) ABSTRACT

Implementations described herein are directed to a device with a processor and memory having stored thereon instructions that, when executed by the processor, cause the processor to acquire an integrated circuit layout of physical cells from a database and define wirelength relationships between input/output connections and a cell count for the physical cells in multiple domains. The instructions may cause the processor to define wirelength parameters of the integrated circuit layout in each domain of the multiple domains and generate a data file for the integrated circuit layout of the physical cells based on the wirelength relationships and the wirelength parameters to guide power and performance of the integrated circuit layout of the physical cells. The instructions may cause the processor to fabricate, or contribute to the fabrication of, an integrated circuit based on the data file for the integrated circuit layout of the physical cells.

20 Claims, 6 Drawing Sheets

(56) References Cited

OTHER PUBLICATIONS

Christie, Phillip; "The Interpretation and Application of Rent's Rule"; IEEE Transactions on Very Large Scale Integration (VLSI) Systems; vol. 8, No. 6; IEEE; 2000.
Davis, et al.; "A Stochastic Wire-Length Distribution for Gigascale Integration (GSI)—Part I: Derivation and Validation"; IEEE Transactions on Electron Devices; vol. 45, No. 3; IEEE; Mar. 1998.
Landman, et al.; "On a Pin Versus Block Relationship for Partitions of Logic Graphs"; IEEE Transactions on Computers; vol. c-20, No. 12; IEEE; Dec. 1971.

* cited by examiner

WIRELENGTH DISTRIBUTION SCHEMES AND TECHNIQUES

BACKGROUND

This section is intended to provide some information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Knowledge of wirelength distribution of a design along with technology parameters, such as interconnect metal-stack details, electrostatic properties of the transistor technology, wire Resistance-Capacitance (RC), etc., enable accurate performance and power modelling for early analysis and optimizations. The conventional Rent's rule is a method used to derive wirelength distribution of integrated circuits (e.g., CPU, memories, etc.).

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to providing wirelength distribution schemes and techniques for performance, power, reliability and yield prediction of integrated circuits. Rent's rule refers to a conventional method that may be used to derive wirelength distribution of integrated circuits (e.g., CPU, memories, etc.). Rent's rule defines a power-law relation in Equation (1) between a number of input/output (IO) connections (termed as T) of a system with a number of gates (termed as N) of the system, using Rent's parameters k and p, which are extracted from an integrated circuit layout based on defined boundaries, synthesized netlist partitioning, and partitioning of placed designs.

$$T = f(N,k,p) = k \cdot N^p \qquad \text{Equation (1):}$$

This relation of Equation (1) may be used to deduce wirelength distribution of an integrated circuit layout by the following Equations (2), (3), where Iidf(l) is the total number of interconnects in a system of length l, Mt(l) is a total number of gate pairs in a system that are separated by distance l, and I exp(l) is a number of IO connections between Mt(l).

$$Iidf(l) = Mt(l) \cdot I\exp(l) \qquad \text{Equation (2):}$$

$$I\exp(l) \alpha f(N,k,p) \qquad \text{Equation (3):}$$

To overcome deficiencies of the conventional Rent's rule, various implementations described herein define a multi-domain based Rent's rule that defines Rent's parameters for multiple different domains (e.g., 3) that may be used to formulate accurate relations between IO connections (T) and cell-count (N) in each domain of the multiple domains. As described herein below, multiple different domains may include a standard cell domain, a functional implementation domain, and a chip periphery domain. These and other features of wirelength distribution is described herein below.

Various implementations of providing various wirelength distribution schemes and techniques will now be described in detail herein with reference to FIGS. 1-6.

Figure 1:
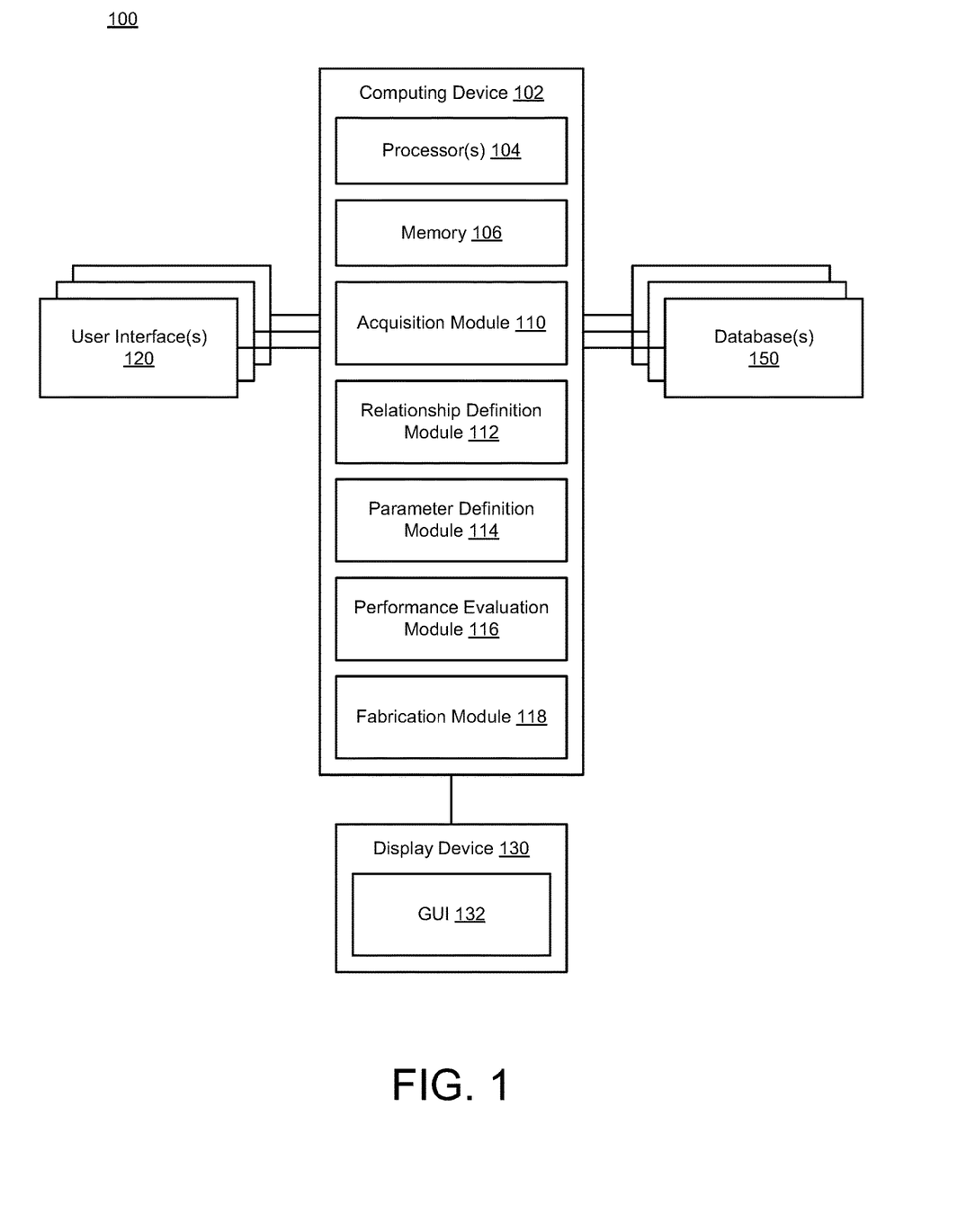
FIG. 1 illustrates a diagram of a system for implementing wirelength distribution techniques in accordance with various implementations described herein.

FIG. 1 is a block diagram illustrating one embodiment of an apparatus 100 that utilizes a computing device 102 for implementing various wirelength distribution schemes and techniques with various methods associated therewith.

In reference to FIG. 1, the apparatus 100 may be implemented as a system having the computing device 102 purposed for wirelength distribution, thereby transforming the computing device 102 into a special purpose machine dedicated to implementation of wirelength distribution schemes and techniques, as described herein. Hence, the computing device 102 may include standard element(s) and/or component(s), including at least one processor(s) 104, memory 106 (e.g., non-transitory computer-readable storage medium), peripherals, power, and various other computing elements and/or components that are not specifically shown in FIG. 1. Further, the apparatus 100 may be associated with a display device 130 (e.g., a monitor or other display) that may be used to provide a graphical user interface (GUI) 132. In some instances, the GUI 132 may be used to receive input from a user (e.g., user input) associated with wirelength distribution schemes and techniques. In some other instances, one or more other user interfaces (UI) 120 (e.g., one or more other computing devices having GUIs or similar) may be used to receive input from one or more other users (e.g., providing other user input) associated with wirelength distribution schemes and techniques. The apparatus 100 may also be associated with one or more databases 150 that may be configured to store and/or record data and information related to the users and wirelength distribution schemes and techniques. As described herein, the one or more database(s) 150 may include one or more technology libraries having information related to physical cell(s) and integrated circuit layout(s) of the physical cell(s).

Accordingly, the apparatus 100 may thus include the computing device 102 and instructions stored or recorded on the computer-readable medium 106 (or the one or more databases 150) and executable by the at least one processor 104. The apparatus 100 may be utilized for implementing wirelength distribution schemes and techniques. Further, the apparatus 100 may include the display device 130 for providing output to a user, and the display device 130 may include the GUI 132 for receiving input from the user. In some cases, the one or more UIs 120 may be used for providing output to one or more other users and receiving input from the one or more other users.

The computing device 102 may include one or more modules, such as, e.g., an acquisition module 110. In some scenarios, the acquisition module 110 may acquire an integrated circuit layout of physical cells from a database (e.g., database(s) 150). As described herein, the database may include various technology libraries having information related to the physical cells and the integrated circuit layout of the physical cells.

The computing device 102 may include a relationship definition module 112. In some scenarios, the relationship definition module 112 may define wirelength distribution relationships between input/output (IO) connections (T) and a cell count (N) for the physical cells in multiple domains. The multiple domains may include a standard cell domain (SC domain), a functional implementation domain (FI domain), and a chip periphery domain (CP domain).

The computing device 102 may include a parameter definition module 114. In some scenarios, the parameter definition module 114 may define wirelength distribution parameters of the integrated circuit layout in each domain of the multiple domains, including the standard cell domain, the functional implementation domain, and the chip periphery domain.

The standard cell domain may be defined for a subset of physical cells in the integrated circuit layout including the IO connections (T) and the cell count (N) for the physical cells. The relationship definition module 112 may further categorize the subset of physical cells as combinational cells and sequential cells to derive a physical relationship between a number of n-type and p-type (np) transistor pairs and a number of the IO connections of the physical cells. The physical relationship may be categorized into logic components and drive components, wherein one or more np transistor pairs may be drive strength devices of the physical cells and may thus not translate into IO connections.

The functional implementation domain may be defined for extraction of the wirelength distribution parameters based on a placed-and-routed pattern defined by a selection box to count a number of the physical cells (N) within the selection box and to count a number of IO connections crossing the selection box (T) that belong to the physical cells disposed within the selection box.

The chip periphery domain may be defined as the physical boundary or perimeter of the integrated circuit layout of physical cells. The fan-out pattern (or design) of the integrated circuit layout may be defined as the number of branches of interconnects between the physical cells and/or related components. Sometimes, the fan-out pattern may be dependent on a Manhattan length of the interconnects between logic gates in the integrated circuit layout. The fan-out pattern may be dependent on microarchitecture and technology. In some instances, the wirelength distribution prediction of the integrated circuit may use the fan-out pattern for high accuracy.

The computing device 102 may include a performance evaluation module 116. In some scenarios, the performance evaluation module 116 may generate a power and performance related data file for the integrated circuit layout of the physical cells based on the wirelength distribution parameters and the wirelength distribution relationships. The power and performance related data file may refer to a wirelength distribution of the physical cells for the integrated circuit layout. The wires may be statistically sampled from the wirelength distribution, and performance estimations may be generated by using critical paths based on the statistically sampled wires. Further, interconnect power estimates may be generated by determining of a number of interconnects of a particular length in the integrated circuit layout of the physical cells and by assigning to metal-levels statistically.

The computing device 102 may include a fabrication module 118. In some scenarios, the fabrication module 118 may fabricate, cause to be fabricated, facilitate the fabrication of, or contribute to the fabrication of, an integrated circuit based on the power and performance related data file for the integrated circuit layout of the physical cells. These and various other features associated with wirelength distribution are described in greater detail herein below.

In reference to FIG. 1, the apparatus 100 is shown using various functional blocks or modules that represent discrete functionality. However, it should be understood that such illustration is provided for clarity and convenience, and therefore, it should be appreciated that the various functionalities may overlap or be combined within a described block(s) or module(s), and/or may be implemented by one or more additional block(s) or module(s) that are not specifically illustrated in FIG. 1. Further, it should be understood that various standard and/or conventional functionality that may be useful to the apparatus 100 of FIG. 1 may be included as well even though such standard and/or conventional elements are not illustrated explicitly, for the sake of clarity and convenience.

Figure 2:
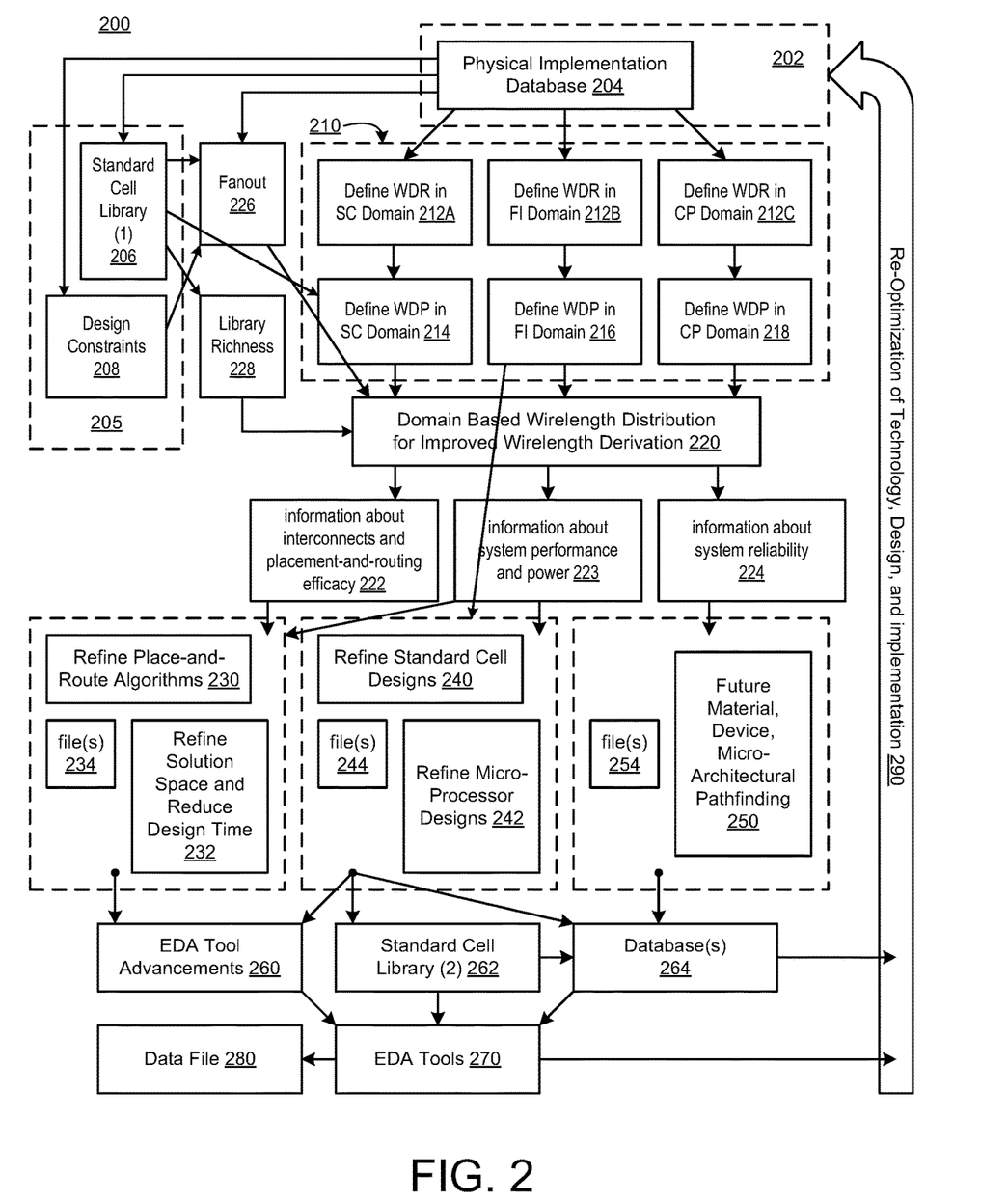
FIG. 2 illustrates a process flow diagram of a method for implementing wirelength distribution in accordance with various implementations described herein.

FIG. 2 illustrates a process flow diagram of a method 200 for creating a power and performance data file by implementing wirelength distribution in accordance with various implementations described herein.

As shown in FIG. 2, method 200 utilizes an implementation space 202 having access to a physical implementation database 204 to provide various information resources to a design space 205 and a wirelength distribution space 210. In some instances, method 200 may acquire an integrated circuit layout of physical cells from database 204.

In reference to the design space 205, a first standard cell library 206 and a design constraints library 208 may access, obtain and receive various information resources from the physical implementation database 204. Method 200 may generate a fanout pattern 226 for IO interconnects of an integrated circuit layout based on information accessed, obtained and received from the first standard cell library 206 and/or the design constraints library 208. In some cases, the fanout pattern 226 may be referred to as an interconnect fanout model. Method 200 may generate a library richness 228 for a number of gates of the integrated circuit based on information accessed, obtained and received from the first standard cell library 206 and/or the design constraints library 208.

In reference to the wirelength distribution space 210, method 200 may define wirelength distribution relationships (WDR) between input/output (IO) connections (T) and a cell count (N) for the physical cells in multiple domains. The multiple domains may include a standard cell (SC) domain 212A, a functional implementation (FI) domain 212B, and a chip periphery (CP) domain 212C. For instance, method 200 may utilize information accessed, obtained and received from various information resources provided by the physical implementation database 202 to define the wirelength distribution relationships (WDR) between input/output (IO) connections (T) and the cell count (N) for the physical cells in each of the multiple domains 212A, 212B, 212C so as to assist with deriving a domain based wirelength distribution 220 for improved wirelength derivation of Rent's parameters.

Further, in reference to the wavelength distribution space 210, method 200 may define one or more wavelength distribution parameters (WDP) from corresponding wavelength distribution relationships (WDR) between the input/output (IO) connections (T) and the cell count (N) for the physical cells in each of the multiple domains 212A, 212B, 212C. Based on these WDR definitions, method 200 may define wavelength distribution parameters (WDP) of the integrated circuit layout for each of the multiple domains including the standard cell domain 214, the functional implementation domain 216, and the chip periphery domain 218 so as to assist with deriving the domain based wavelength distribution 220 for improved wavelength derivation of Rent's parameters. The standard cell domain 214 may also utilize information accessed, obtained and received from the first standard cell library 206.

Based on the domain based wavelength distribution 220, method 200 may define, derive and/or provide various information resources for further development and refinement of the integrated circuit layout. For instance, method 200 may define, derive and/or provide information about IO interconnects and placement-and-routing efficacy 222 of the integrated circuit layout. In another instance, method 200 may define, derive and/or provide information about system performance and power 223 of the integrated circuit layout. Also, in another instance, method 200 may define, derive and/or provide information about system reliability 224 of the integrated circuit layout.

Based on the various information resources 222, 223, 224, method 200 may use the information for further development and refinement of the integrated circuit layout. For instance, based on information resources 222, 223, method 200 may refine place-and-route algorithms 230, refine a solution space and reduce design time 232, and generate one or more file(s) 234 in reference to these refinements. In another instance, based on information resource 222 and functional implementation domain 216, method 200 may refine standard cell designs 240, refine micro-processor designs 242, and also further generate one or more file(s) 244 in reference to these refinements. Also, in another instance, based on information resource 224, method 200 may define, derive and/or generate future material, device, and micro-architectural pathfinding resources 250, and also further generate one or more file(s) 254 in reference to future developments and/or refinements.

Based on these developments and refinements, method 200 may define, derive and/or provide various related information resources for EDA (Electronic Design Automation) tool advancements 260 (e.g., initial constraints, algorithms, scripts, etc.), a second standard cell library 262 (e.g., for design and tuning for same and future technology), and one or more database(s) 264 (e.g., for same and future technology). For instance, based on development and refinement information in 230, 232, 234, 240, 242, 244, method 200 may define, derive and/or provide information resources for EDA tool advancements 260. In another instance, based on development and refinement information in 240, 242, 244, method 200 may define, derive and/or provide information resources for the second standard cell library 262. Also, in another instance, based on development and refinement information in 240, 242, 244, 250, 254, method 200 may define, derive and/or provide information resources for the database(s) 264. Further, in some implementations, method 200 may utilize the EDA tool advancements 260, the second standard cell library 262 and the database(s) 264 to define, derive, develop and/ore refine various EDA tools 270. Using the EDA tools 270, method 200 may generate a power and performance related data file 280 for the integrated circuit layout of the physical cells based on wavelength distribution parameters (e.g., from 210) and wavelength distribution relationships (e.g., from 220). Further, method 200 may fabricate, facilitate the fabrication of, contribute to the fabrication of, or cause to be fabricated, an integrated circuit based on the power and performance related data file 280 for the integrated circuit layout of the physical cells. Method 200 may also utilize information from database(s) 264 and the EDA tools 270 for re-optimization of technology, design, and various implementations 290 of the physical implementation database 202.

Figure 3A:
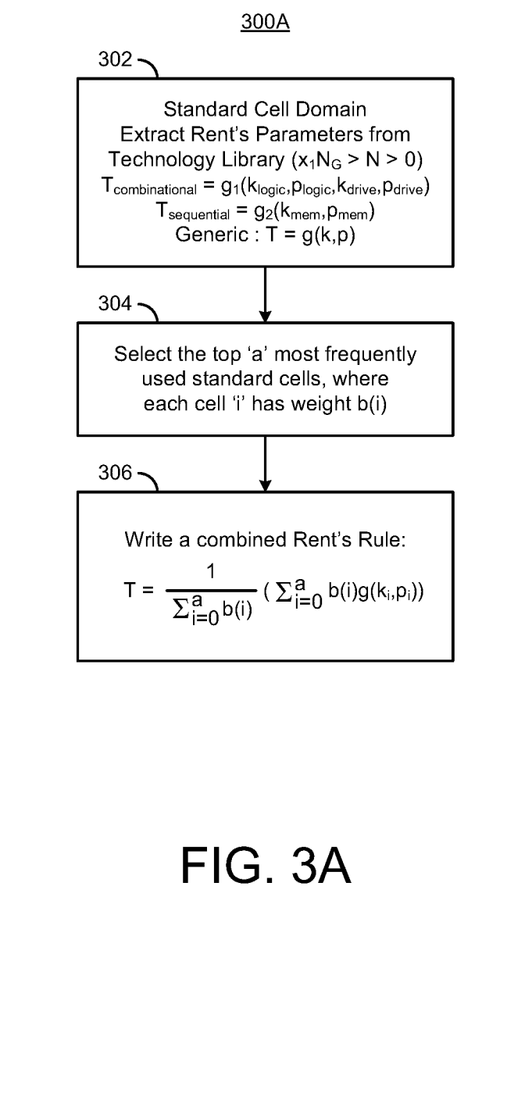
FIGS. 3A-3C illustrate process flow diagrams of various methods for extracting parameter information for implementing domain-based wirelength distribution in accordance with various implementations described herein.
Figure 3B:
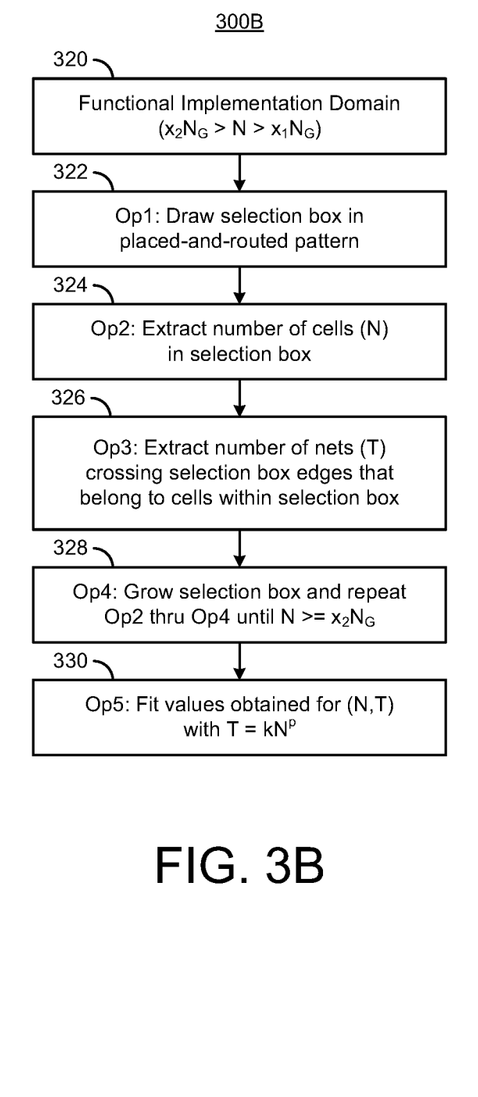
Figure 3C:
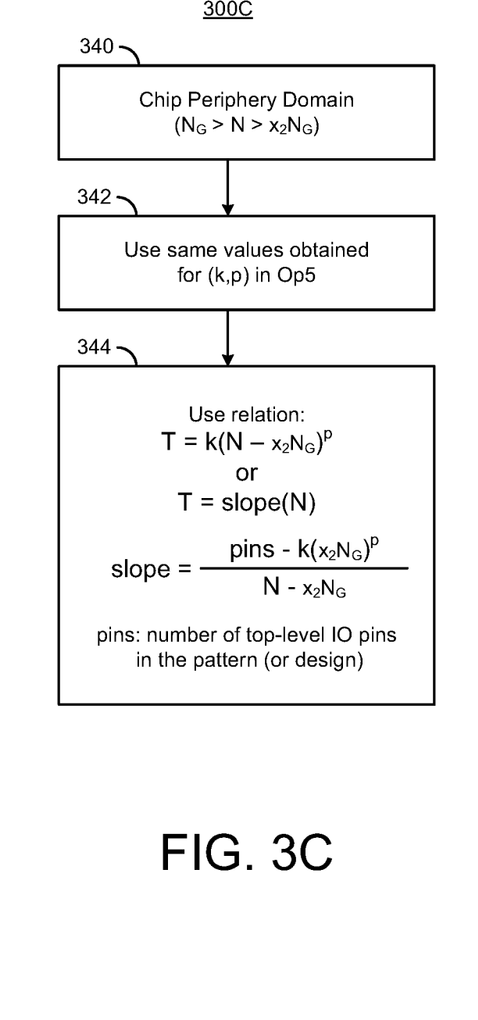

FIGS. 3A-3C illustrate process flow diagrams of various methods for extracting parameter information for implementing domain-based wavelength distribution in accordance with various implementations described herein. In particular, FIG. 3A illustrates a process flow diagram of a method 300A for extracting parameter information related to the standard cell domain, FIG. 3B illustrates a process flow diagram of a method 300B for extracting parameter information related to the functional implementation domain, and FIG. 3C illustrates a process flow diagram of a method 300C for extracting parameter information related to the chip periphery domain.

In reference to FIG. 3A, method 300A may extract parameter information related to the standard cell domain for implementing various wavelength distribution schemes and techniques. For instance, at block 302, method 300A may extract Rent's parameters from a technology library where $x_1 N_G > N > 0$ along with SCD(1) and SCD(2) below, which are derived from the generic form $T = g(k, p)$, as follows:

$$T_{combinational} = g_1(k_{logic}, p_{logic}, k_{drive}, p_{drive}) \quad \text{SCD(1):}$$

$$T_{sequential} = g_2(k_{mem}, p_{mem}) \quad \text{SCD(2):}$$

At block 304, method 300A may select the 'a' most frequently used standard cells, where each cell 'i' has a weight b(i). At block 306, method 300A may write a combined Rent's rule, as follows:

$$\text{SCD(3): } T = \frac{1}{\sum_{i=0}^{a} b(i)} \left( \sum_{i=0}^{a} b(i) g(k_i, p_i) \right)$$

In some implementations, the standard cell domain may be defined for a subset of cells in the pattern or design (where, $N = 1$ to $x_1 N_G$), where $N_G$ is a total gate count in the system (e.g., an integrated circuit layout), and $x_1 N_G$ and $x_2 N_G$ may represent fractions of $N_G$ such that $x_2 N_G > x_1 N_G$. In addition, the cells may be categorized as combinational cells or sequential cells so as to deduce unique relations between a number of n-type and p-type (np) transistor pairs termed as $N_P$, and a number of IO pins in the standard cell. Further, the relation may be categorized as logic components or drive components since some of the np transistor pairs may be used solely for drive-strength of the cell and do not translate into IO pins. The Rent's parameters for the standard cell domain may be obtained by researching technology libraries for the most frequently used cells in the pattern or design.

Combinational cells may be defined as:

$$T = g(N_P, k_{logic}, p_{logic}, k_{drive}, p_{drive}) = k_{logic} \cdot N_P^{p_{logic}} + k_{drive} \cdot N_P^{p_{drive}} \quad \text{Equation (4):}$$

Sequential cells may be defined as:

$$T = g(N_p, k_{mem}, p_{mem}) = k_{logic} \cdot k_{mem} \cdot N_p^{pmem} \qquad \text{Equation (5):}$$

The number of np transistor pairs ($N_p$) may be deduced from a multiple (n) of the gate count (N) in equation (6) below. As such, the number of np transistor pairs ($N_p$) may be derived from an average number of np transistor pairs in the most frequently used cells in the pattern or design, as follows:

$$Np = n \cdot N \qquad \text{Equation (6):}$$

In reference to FIG. 3B, method 300B may extract parameter information related to the functional implementation domain for implementing various wirelength distribution schemes and techniques. For instance, at block 320, method 300B may extract (or define) Rent's parameters from a technology library where $x_2 N_G > N > x_1 N_G$.

Figure 4:
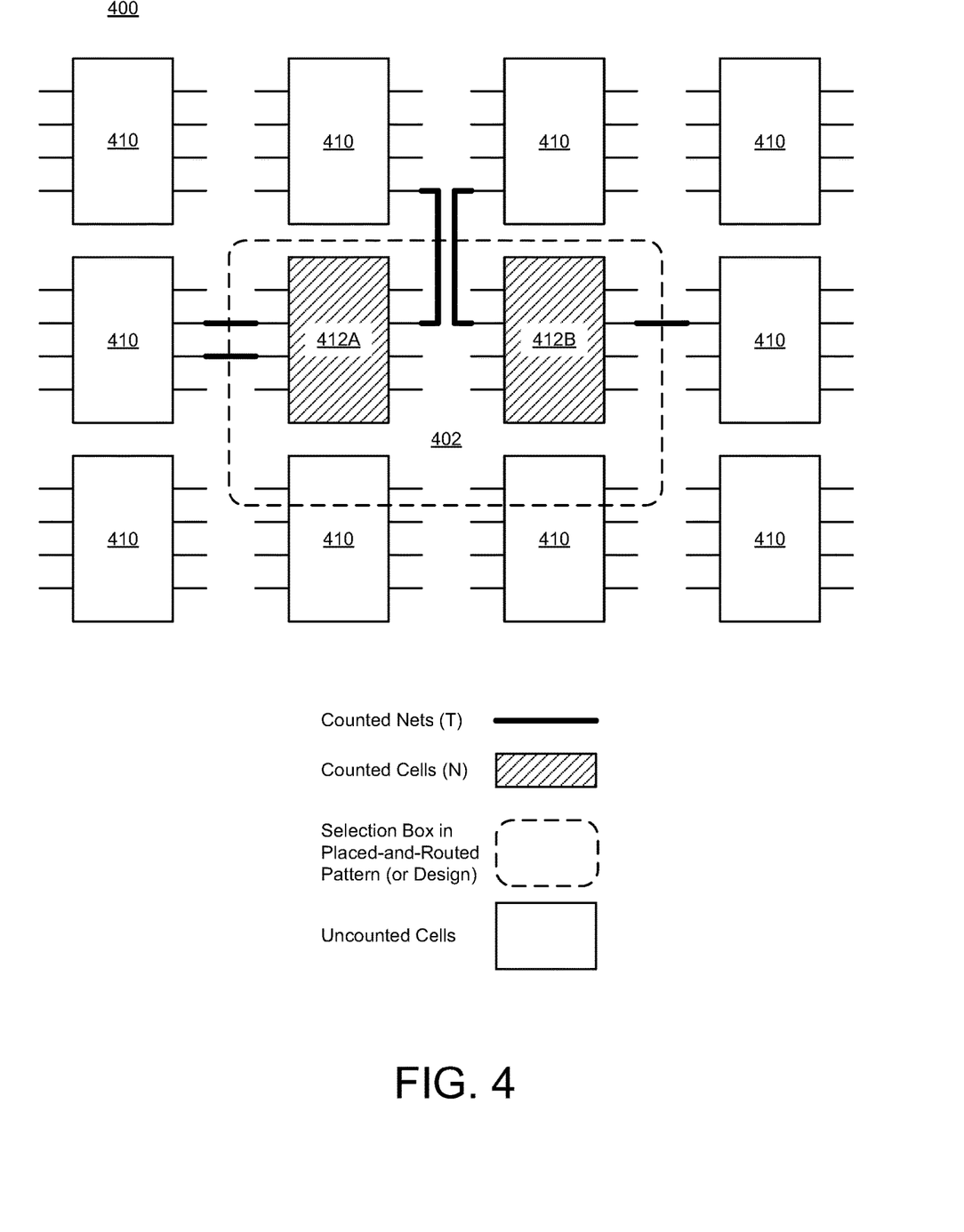
FIG. 4 illustrates a diagram of a method for extracting parameter information from a placed-and-route integrated circuit layout for implementing domain-based wirelength distribution in accordance with various implementations described herein.

At block 322, method 300B may perform a first operation (Op1) related to drawing a selection box in a placed-and-routed pattern. For instance, FIG. 4 shows an example of a schematic diagram of a placed-and-routed pattern (or design) 400 having a selection box 402 drawn (with a dashed line) around a number of counted cells (N) 412A, 412B.

At block 324, method 300B may perform a second operation (Op2) related to extracting a number of cells (N) 412A, 412B in the selection box 402. For instance, in the example placed-and-routed pattern (or design) 400, there are two (2) counted cells 412A, 412B (where, N=2) in the selection box 402.

At block 326, method 300B may perform a third operation (Op3) related to extracting a number of nets (T) crossing the selection box edges that belong to cells within the selection box. For instance, in the example placed-and-routed pattern (or design) 400, the counted nets (T) refer to the heavily bolded lines between wiring terminals of the cells. In the instance of FIG. 4, there are five (5) counted nets (where, T=5) as shown, e.g., in FIG. 4 with the heavily bolded lines between wiring terminals of the uncounted cells 410 and the counted cells 412A, 412B.

At block 328, method 300B may perform a fourth operation (Op4) related to growing the selection box and repeating the second operation (Op2) through the fourth operation (Op4) until $N > x_2 N_G$.

At block 330, method 300B may perform a fifth operation (Op5) related to fitting values that were obtained for (N,T) with $T = kN^p$.

In some implementations, the functional implementation domain may be derived or defined from ($x_2 N_G > N > x_1 N_G$). As a sample size of gates (N) grow to represent the functionality of the system (e.g., the integrated circuit layout), the Rent's relation defined by Equation (1) above holds. The Rent's parameters may be extracted from placed-and-routed pattern (or designs) by defining one or more selection boxes so as to count a number of cells (N) within each selection box and to also count a number of unique nets (T) crossing each selection box that belong to the contained cells in each selection box.

In reference to FIG. 3C, method 300C may extract parameter information related to the chip periphery domain for implementing various wirelength distribution schemes and techniques. For instance, at block 340, method 300C may extract (or define) Rent's parameters from a technology library where $N_G > N > x_2 N_G$.

At block 342, method 400C may use the same values obtained for (k,p) in the fifth operation (Op5) with method 300B at block 330 of FIG. 3B.

At block 344, method 300C may use the following relations:

$$CPD(1): T = k(N - x_2 N_G)^p, \text{ or}$$

$$CPD(2): T = \text{slope}(N), \text{ where}$$

$$\text{slope}(N) = \frac{\text{pins} - k(N - x_2 N_G)^p}{N - x_2 N_G}$$

In this instance of slope(N), the term 'pins' refers to a number of top-level IO pins in the pattern (or design).

In some implementations, the chip periphery domain may be derived or defined from ($N_G > N > x_2 N_G$). As the sample size grows large, the number of nets (T) may begin decreasing as the chip periphery approaches and a relation is formulated, as follows:

$$T = h(N, k, p) = k \cdot (N - x_2 N_G)^p \qquad \text{Equation (7A):}$$

OR $$T = h(N, k, p) = \text{slope}(N) \qquad \text{Equation (7B):}$$

In reference to a fanout pattern (or related model), a number of branches of the interconnect may be termed as fanout, as presented herein. Fanout may be dependent on a Manhattan length of the connections between logic gates in the pattern (or design), as a result of placed-and-routed optimization algorithms in Electronic-Design-Automation (EDA) tools. In some instances, interconnect fanout dependency may be identified and/or modeled on the Manhattan length of the interconnect using a unique Beta function.

Generally, Manhattan routing (or Manhattan length) may be referred to as a PCB routing strategy. In some implementations, one layer may be dedicated for horizontal tracks, and another layer may be dedicated for vertical tracks. In this technique, no horizontal tracks are used on the vertical layer, and no vertical tracks are used on the horizontal layer. Thus, inter-layer electrical connections between horizontal and vertical tracks may pass through a via, and this strategy may provide dense boards with a reduced routing process.

In reference to a wirelength pattern (or related model), new wirelength models may utilize the fanout pattern (or related model) for higher accuracy in wirelength prediction for the integrated circuit layout. The domain based Rent's rule definition as presented herein may be implemented to improve existing wirelength distribution pattern (or related models) as described in FIG. 3C and equation (3) when modified as follows:

$$I \exp(l) \alpha g(N, k, p) \rightarrow N < x_1 N_G \qquad \text{Equation (8):}$$

$$I \exp(l) \alpha f(N, k, p) \rightarrow x_1 N_G < N < x_2 N_G \qquad \text{Equation (9):}$$

$$I \exp(l) \alpha h(N, k, p) \rightarrow x_2 N_G < N < N_G \qquad \text{Equation (10):}$$

In reference to a priori performance and power model, once wirelength distribution of the system is obtained, wires may be statistically sampled from the wirelength distribution, and performance estimations may be generated and/or derived by using a statistical critical path model. Additionally, accurate interconnect power estimates may be generated and/or derived with knowledge of a number of interconnects of a particular length in the system and assigning them to metal-levels statistically. These metrics may enable accurate performance and power modelling of a microprocessor (μp).

As to advantages, it has become increasingly difficult to make early power and performance estimates with advancements in technology in the Front-End-Of-the-Line (FEOL) and the Back-End-Of-the-Line (BEOL), which may be considered critical when making early trade-offs and optimizations. Accordingly, various implementations presented herein provide for wirelength distribution estimation of an integrated circuit layout that has a substantially higher accuracy than existing conventional methods. These models essentially provide information about the number of interconnects of a particular length in a pattern (or design) of an integrated circuit layout. Improving accuracy of these models may enable more accurate power and performance evaluations and optimizations before going through an entire product design cycle and may provide better expectations to end users.

FIG. 4 illustrates a diagram of a method (or technique) for extracting parameter information from a placed-and-route integrated circuit layout (or design) 400 for implementing domain-based wirelength distribution in accordance with various implementations described herein. For instance, FIG. 4 shows an example of a schematic diagram of the placed-and-routed pattern (or design) 400 having the selection box 402 drawn (with a dashed line) around the number of counted cells (N) 412A, 412B. As shown in FIG. 4, there are two (2) counted cells 412A, 412B (where, N=2) in the selection box 402, and the counted nets (T) refer to the heavily bolded lines between wiring terminals of the cells. In this instance of FIG. 4, there are five (5) counted nets (where, T=5) with the heavily bolded lines between wiring terminals of the uncounted cells 410 and the counted cells 412A, 412B.

Figure 5:
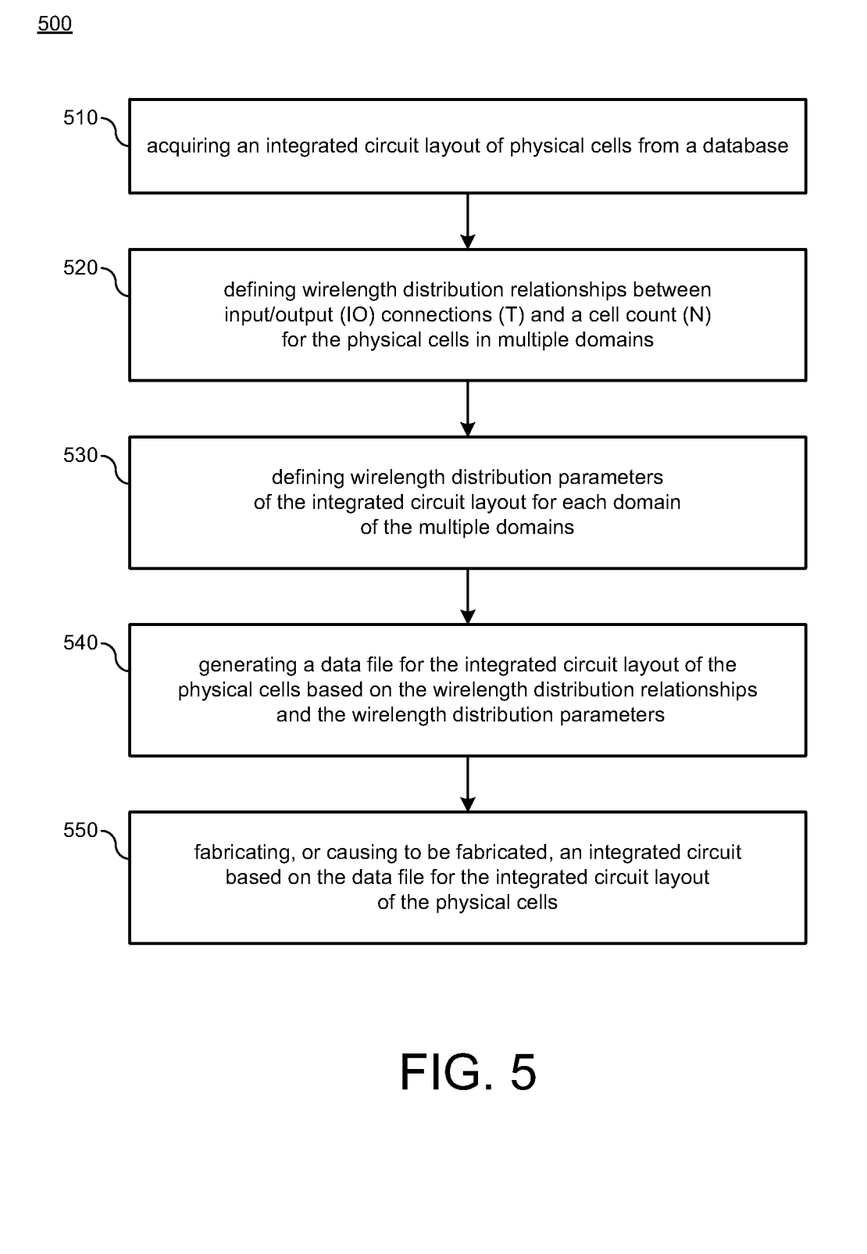
FIG. 5 illustrates a process flow diagram of a method for implementing wirelength distribution in accordance with various implementations described herein.

FIG. 5 illustrates a process flow diagram of a method 500 for implementing wirelength distribution in accordance with various implementations described herein.

It should be understood that even though method 500 may indicate a particular order of operation execution, in some cases, various certain portions of operations may be executed in a different order, and on different systems. In some other cases, additional operations and/or steps may be added to and/or omitted from method 500. Method 500 may be implemented in hardware and/or software. If implemented in hardware, method 500 may be implemented with various components, such as described herein above in reference to FIGS. 1-4C. If implemented in software, method 500 may be implemented as a program or software instruction process that may be configured for implementing various wirelength distribution schemes and techniques as described herein. Further, if implemented in software, various instructions related to implementing method 500 may be stored in memory, wherein a computer, a server, or various other computing devices having a processor and memory may be configured to perform method 500.

In reference to FIG. 5, method 500 may be utilized for implementing various wirelength distribution schemes and techniques.

At block 510, method 500 may acquire an integrated circuit layout of physical cells from a database. As described herein, the database may include one or more technology libraries having information related to the physical cells and the integrated circuit layout of the physical cells.

At block 520, method 500 may define wirelength distribution relationships between input/output (IO) connections (T) and a cell count (N) for the physical cells in multiple domains including a standard cell domain, a functional implementation domain, and a chip periphery domain.

The standard cell domain may be defined for a subset of physical cells in the integrated circuit layout including the IO connections (T) and the cell count (N) for the physical cells. Defining wirelength parameters may include categorizing the subset of physical cells as combinational cells and sequential cells to derive a physical relationship between a number of n-type and p-type (np) transistor pairs and a number of the IO connections of the physical cells. The physical relationship may be categorized into logic components and drive components. The np transistor pairs are drive strength devices of the physical cells, and np transistor pairs may not translate into IO connections.

The functional implementation domain may be defined for extraction of the wirelength distribution parameters based on a placed-and-routed pattern defined by a selection box to count a number of the physical cells (N) within the selection box and to count a number of IO connections crossing the selection box (T) that belong to the physical cells disposed within the selection box.

The chip periphery domain may be defined as the physical boundary or perimeter of the integrated circuit layout of physical cells. The fan-out pattern of the integrated circuit layout may be defined as the number of branches of interconnects between the physical cells. The fan-out pattern may be dependent on a Manhattan length of the interconnects between logic gates in the integrated circuit layout. The fan-out pattern may be dependent on microarchitecture and technology. The wirelength distribution prediction of the integrated circuit may use the fan-out pattern for high accuracy.

At block 530, method 500 may define wirelength distribution parameters of the integrated circuit layout for each domain of the multiple domains, including the standard cell domain, the functional implementation domain, and the chip periphery domain.

At block 540, method 500 may generate a data file (e.g., a power and performance related data file) for the integrated circuit layout of the physical cells based on the wirelength distribution parameters and the wirelength distribution relationships. The power and performance related data file may refer to a wirelength distribution of the physical cells for the integrated circuit layout. Sometimes, the wires may be statistically sampled from the wirelength distribution, and performance estimations may be generated by using critical paths based on the statistically sampled wires. Further, various interconnect power estimates may be generated by determining a number of interconnects of a particular length in the integrated circuit layout of the physical cells and by assigning to metal-levels statistically.

At block 550, method 500 may fabricate, facilitate the fabrication of, contribute to the fabrication of, or cause to be fabricated, an integrated circuit based on the data file (e.g., the power and performance related data file) for the integrated circuit layout of the physical cells.

The various implementations described herein provide for improved accuracy and physical insight to the interconnect design of an integrated circuit, which results in an overall improved impact on system performance and power. For instance, the present disclosure provides for methods of deriving different Rent's parameters for a small number of gates, functional implementation blocks, and the chip periphery of the design. The method may provide for deriving Rent's parameters for standard cell designs. The method may provide for deriving Rents parameters by recursively partitioning the physical (placed-and-routed) design and counting a number of unique nets crossing the partition. The method may provide for capturing the transition of the densely routed interconnects to the IO pin count at the chip periphery. The method may provide for deriving wire-length distribution of a design based on a domain-based Rents parameters. The method may provide for modeling fanout of the design to accurately model wirelength distribution. The method may provide for a critical path delay model that incorporates a new wire-length distribution model. The method may provide for a power dissipation model based on a statistical metal-level assignment based on a new wirelength distribution model. The method may provide for estimating wire-load to perform EM analysis at standard-cell level or perform early EM analysis at a chip-level using a new wirelength distribution. The method may provide for studying an impact of patterning schemes on interconnects, critical-paths, and power dissipation of systems.

Figure 6:
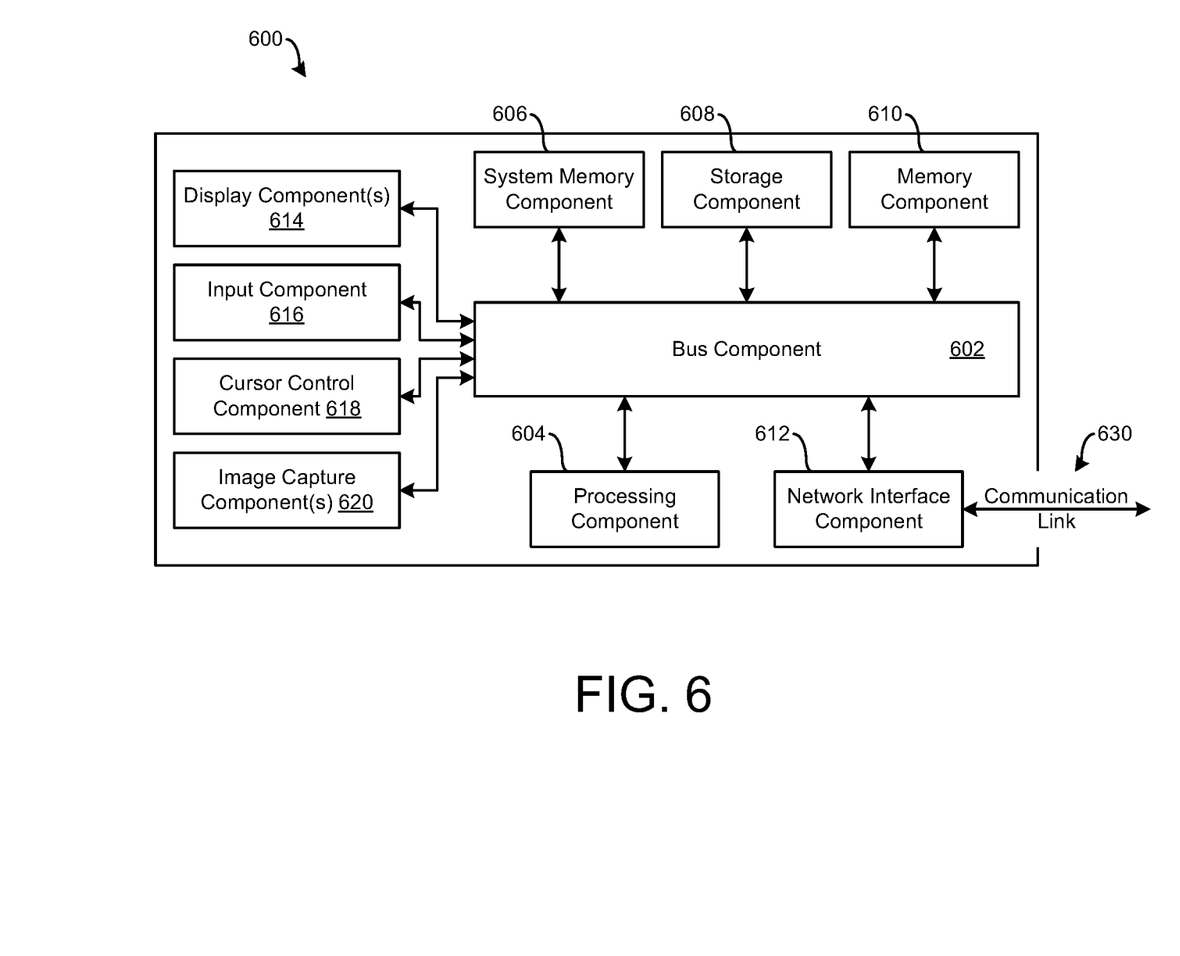
FIG. 6 illustrates a diagram of a computing device in accordance with various implementations described herein.

FIG. 6 is a block diagram of a computing device 600 suitable for implementing various implementations described herein, including, e.g., the computing device 102 and components associated therewith in FIG. 1. Thus, the computing device 600 may be embodied as the computing device 102 and be configured for network communication with various other computing devices over a wired or wireless network.

The computer device 600 may be implemented as various types of computing devices, such as, e.g., a server, a personal computer (PC), a laptop, a notebook, a mobile communication device, or similar. The computer device 600 may include a bus 602 (or other communication mechanism for communicating information) that interconnects the various subsystems and/or components, such as, e.g., processing component 604 (e.g., processor, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., CRT or LCD), input component 616 (e.g., keyboard), cursor control component 618 (e.g., mouse or trackball), and image capture component 620 (e.g., analog or digital camera). In some implementations, disk drive component 610 may comprise a database having one or more disk drive components.

The computer device 600 may perform various specific operations by processor 604 executing one or more sequences of one or more instructions contained in system memory component 606. Such instructions may be read into system memory component 606 from another computer readable medium, such as static storage component 608 or disk drive component 610. In some cases, hard-wired circuitry may be used in place of or in combination with software instructions to thereby implement the various wire-length distribution (SSS) schemes and/or techniques described herein.

Logic may be encoded in a computer readable medium, which may refer to any medium that participates in providing instructions to processor 604 for execution. Such a medium may take many forms, including but not limited to, non-volatile media and volatile media. In various implementations, non-volatile media includes optical or magnetic disks, such as disk drive component 610, and volatile media includes dynamic memory, such as system memory component 606. In some implementations, data and information related to execution instructions may be transmitted to computer device 600 via a transmission media, such as, e.g., in a form of acoustic or light waves, including those generated during radio wave and infrared data communications. Transmission media may include coaxial cables, copper wire, and/or fiber optics, including wires that comprise bus 602.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various implementations, execution of instruction sequences to practice the wirelength distribution schemes and techniques described herein may be performed by computer device 600. In other implementations described herein, a plurality of computer systems 600 coupled by communication link 630 (e.g., LAN, WLAN, PTSN, and/or various other wired or wireless networks, including telecommunications, mobile, and/or cellular phone networks) may perform instruction sequences to practice implementations of the present disclosure in coordination with one another.

In various implementations, the computer device 600 may transmit and receive messages, data, information and instructions, including programs (i.e., application code) through communication link 630 and communication interface 612. Further, the received program code may be executed by the processor 604 as received and/or stored in disk drive component 610 or some other non-volatile storage component for execution.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

The various implementations described herein may be used to generate power and performance related data files for a system. These data files may be used to guide the design process and reduce the time required to get to a power/performance optimized design for fabrication; thus, reducing the time-to-market for these designs. In addition, the various implementations described herein may enable exploration and evaluation of various novel technology choices, such as, e.g., various transistor technologies, interconnect technologies, patterning-and-routing technologies, etc., so as to DTCO effectively improve the technical field of semiconductor design-technology co-optimization ( ). Generally, DTCO may entail co-optimizing technology choices with design to enable performance and power optimized end-products. Hence, the end computer operation designed using the various implementations described herein may be higher performing, consuming lower power, and/or incurring lower costs to manufacture, fabricate, build and/or construct.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

Described herein are various implementations of device with a processor and memory having stored thereon instructions that, when executed by the processor, cause the processor to acquire an integrated circuit layout of physical cells from a database and define wirelength relationships between input/output (IO) connections (T) and a cell count (N) for the physical cells in multiple domains including a standard cell domain, a functional implementation domain, and a chip periphery domain. The instructions may further cause the processor to define wirelength parameters of the integrated circuit layout in each domain of the multiple domains and generate a data file for the integrated circuit layout of the physical cells based on the wirelength relationships and the wirelength parameters to guide power and performance of the integrated circuit layout of the physical cells. The instructions may further cause the processor to fabricate, or contribute to the fabrication of, an integrated circuit based on the data file for the integrated circuit layout of the physical cells.

Described herein are various implementations of a method. The method may include acquiring an integrated circuit layout of physical cells from a database and defining wirelength relationships between input/output (IO) connections (T) and a cell count (N) for the physical cells in multiple domains. The method may include defining wirelength parameters in each domain of the multiple domains and generating a data file for the integrated circuit layout of the physical cells based on the wirelength relationships and the wirelength parameters to guide power and performance of the integrated circuit layout of the physical cells. The method may include fabricating, or contributing to the fabrication of, an integrated circuit based on the data file for the integrated circuit layout of the physical cells.

Described herein are various implementations of a non-transitory computer-readable medium having stored thereon computer-executable instructions that, when executed by a computer, cause the computer to acquire an integrated circuit layout of physical cells from a database and define wirelength relationships between input/output (IO) connections (T) and a cell count (N) for the physical cells in multiple domains. The instructions may further cause the computer to define wirelength parameters of the integrated circuit layout for each domain of the multiple domains and generate a data file for the integrated circuit layout of the physical cells based on the wirelength relationships and the wirelength parameters to guide power and performance of the integrated circuit layout of the physical cells. The instructions may further cause the computer to fabricate, or cause to be fabricated, an integrated circuit based on the data file for the integrated circuit layout of the physical cells.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
   a processor; and
   memory having stored thereon instructions that, when executed by the processor, cause the processor to:
   acquire an integrated circuit layout of physical cells from a database;
   define wirelength relationships between input/output (IO) connections (T) and a cell count (N) for the physical cells in multiple domains including a standard cell domain, a functional implementation domain, and a chip periphery domain;
   define wirelength parameters of the integrated circuit layout in each domain of the multiple domains;
   generate a data file for the integrated circuit layout of the physical cells based on the wirelength relationships and the wirelength parameters to guide power and performance of the integrated circuit layout of the physical cells; and
   fabricate, or contribute to the fabrication of, an integrated circuit based on the data file for the integrated circuit layout of the physical cells.

2. The device of claim 1, wherein the standard cell domain is defined for a subset of physical cells in the integrated circuit layout including the IO connections (T) and the cell count (N) for the physical cells.

3. The device of claim 2, wherein the memory further comprises instructions that cause the processor to categorize the subset of physical cells as combinational cells and sequential cells to derive a physical relationship between a number of n-type and p-type (np) transistor pairs and a number of the IO connections of the physical cells.

4. The device of claim 3, wherein the physical relationship is categorized into logic components and drive components, wherein one or more np transistor pairs are drive strength devices of the physical cells and do not translate into IO connections.

5. The device of claim 1, wherein the functional implementation domain is defined for extraction of the wirelength relationships based on a placed-and-routed pattern defined by a selection box to count a number of the physical cells (N) within the selection box and to count a number of IO connections crossing the selection box (T) that belong to the physical cells disposed within the selection box.

6. The device of claim 1, wherein the chip periphery domain is defined as the physical boundary or perimeter of the integrated circuit layout of physical cells.

7. The device of claim 1, wherein the integrated circuit layout includes a fan-out pattern that is dependent on Manhattan lengths of the interconnects between logic gates and design constraints in the integrated circuit layout.

8. The device of claim 7, wherein the fan-out pattern is used for wirelength distribution prediction of the integrated circuit for high accuracy.

9. The device of claim 1, wherein the power and performance related data file refers to a wirelength distribution of the physical cells for the integrated circuit layout, wherein wires are statistically sampled from the wirelength distribution, and wherein performance estimations are generated by using critical paths based on the statistically sampled wires.

10. The device of claim 9, wherein interconnect power estimates are generated by determining a number of interconnects of a particular length in the integrated circuit layout of the physical cells and by assigning to metal-levels statistically.

11. The device of claim 1, wherein the database comprises one or more technology libraries having information related to the physical cells and the integrated circuit layout of the physical cells.

12. A method, comprising:
    acquiring an integrated circuit layout of physical cells from a database;
    defining, by a computer system, wirelength relationships between input/output (IO) connections (T) and a cell count (N) for the physical cells in multiple domains;
    defining, by the computer system, wirelength parameters in each domain of the multiple domains;
    generating, by the computer system, a data file for the integrated circuit layout of the physical cells based on the wirelength relationships and the wirelength parameters to guide power and performance of the integrated circuit layout of the physical cells; and
    fabricating, or contributing to the fabrication of, an integrated circuit based on the data file for the integrated circuit layout of the physical cells.

13. The method of claim 12, wherein the multiple domains include a standard cell domain, and wherein the standard cell domain is defined for a subset of physical cells in the integrated circuit layout including the IO connections (T) and the cell count (N) for the physical cells.

14. The method of claim 12, wherein the multiple domains include a functional implementation domain, and wherein the functional implementation domain is defined for extraction of the wirelength relationships based on a placed-and-routed pattern defined by a selection box to count a number of the physical cells (N) within the selection box and to count a number of IO connections crossing the selection box (T) that belong to the physical cells disposed within the selection box.

15. The method of claim 12, wherein the multiple domains include a chip periphery domain, and wherein the chip periphery domain is defined as the physical boundary or perimeter of the integrated circuit layout of physical cells.

16. The method of claim 12, wherein the integrated circuit layout includes a fan-out pattern that is used for wirelength distribution prediction of the integrated circuit for high accuracy.

17. The method of claim 12, wherein the power and performance related data file refers to a wirelength distribution of the physical cells for the integrated circuit layout, and wherein wires are statistically sampled from the wirelength distribution, and wherein performance estimations are generated by using critical paths based on the statistically sampled wires.

18. The method of claim 17, wherein interconnect power estimates are generated by determining a number of interconnects of a particular length in the integrated circuit layout of the physical cells and by assigning to metal-levels statistically.

19. The method of claim 12, wherein the database comprises one or more technology libraries having information related to the physical cells and the integrated circuit layout of the physical cells.

20. A non-transitory computer-readable medium having stored thereon computer-executable instructions that, when executed by a computer, cause the computer to:
acquire an integrated circuit layout of physical cells from a database;
define wirelength relationships between input/output (IO) connections (T) and a cell count (N) for the physical cells in multiple domains;
define wirelength parameters of the integrated circuit layout for each domain of the multiple domains;
generate a data file for the integrated circuit layout of the physical cells based on the wirelength relationships and the wirelength parameters to guide power and performance of the integrated circuit layout of the physical cells; and
fabricate, or cause to be fabricated, an integrated circuit based on the data file for the integrated circuit layout of the physical cells.

* * * * *